July 9, 1935.　　　M. A. SMITH, JR　　　2,007,505
TRANSMISSION DYNAMOMETER
Filed April 11, 1931
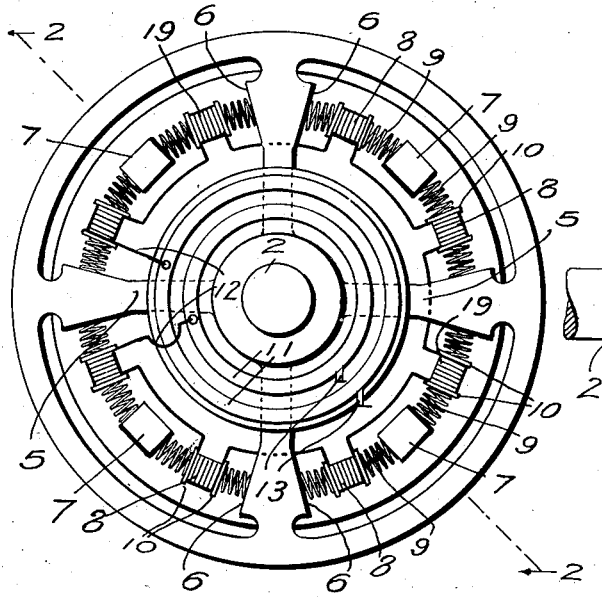
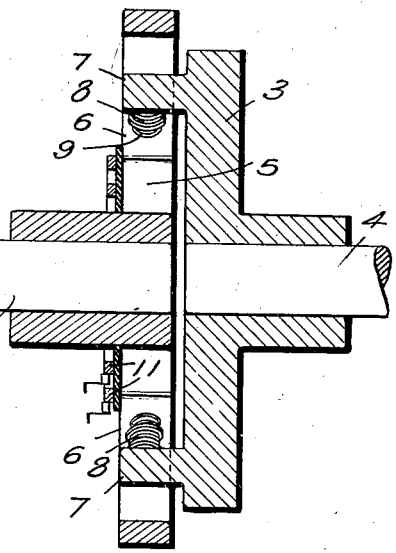
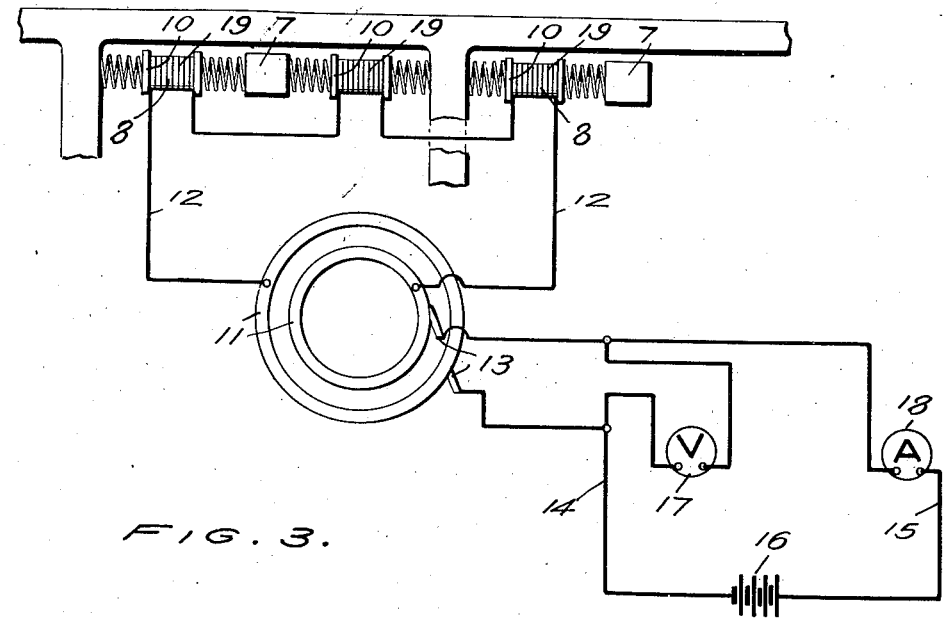
INVENTOR
MARSHALL A. SMITH, JR.
BY Robert H. Young
ATTORNEY Patented July 9, 1935

2,007,505

UNITED STATES PATENT OFFICE 2,007,505

TRANSMISSION DYNAMOMETER

Marshall A. Smith, Jr., South Bend, Ind.

Application April 11, 1931, Serial No. 529,490

3 Claims. (Cl. 177—351)

This invention relates to internal combustion engines, but more particularly to a transmission dynamometer, whereby the power transmitted from the driving member to the driven member of the transmission may be accurately measured from the resistance to an electrical circuit.

With this object in view, the invention consists of an arrangement of an electrical resistance between the driving and the driven members of a transmission, the resistance of which is a function of the pressure on the element or elements constituting the electrical resistance.

The invention further consists of certain other novel details of construction and combinations of parts, all of which will be first fully described and afterwards specifically pointed out in the appended claims.

Referring to the accompanying drawing:

Figure 1 is a diagrammatic view in elevation of a transmission dynamometer constructed in accordance with this invention;

Figure 2 is a vertical sectional view taken on line 2—2 of Fig. 1; and

Figure 3 illustrates diagrammatically the apparatus and the electrical circuit.

Like numerals of reference indicate the same parts throughout the several figures, in which:

1 indicates a driving member fixed to a shaft 2, and 3 is a driven member fixed on a shaft 4.

The driving member 1 includes a plurality of radial spokes 5 each having two oppositely disposed inclined faces 6, while the driven member 3 is supplied with an equal number of lugs 7 projecting from the face of the driven member into the spaces between the said radial spokes 5 of the driving member 1.

Interposed between each lug 7 and the adjacent inclined faces of the radial spokes 5 of the driving member, is an electrical resistance element 8, on each side of which I prefer to interpose a buffer spring 9 insulated from the resistance element 8 by suitable insulating blocks 10, the purpose of said springs being to smooth out variations in the torque when measuring the power delivered to the driven member 3. However, these buffer springs 9 may be dispensed with, and the variations in resistance due to variations in the torque transmitted, may be damped out in the electrical circuit used to measure the resistance of the elements 8.

11 indicates a plurality of slip rings rotatable with the driving member 1 to which the terminals of the resistance elements 8 are electrically connected by the wires 12, while the said resistance elements 8 are themselves electrically connected in series or parallel, or any combination of series-parallel connections desirable or convenient from the standpoint of ease of use or accuracy of measurement. The accompanying drawing therefore illustrates only one example of such electrical connection.

13 indicates the stationary brushes for electrical contact with the said slip rings 11, to which brushes 13 are connected the two wires 14 and 15 from the battery 16, while arranged in this battery circuit is any suitable resistance measuring instrument or instruments, such as Wheatstone bridges, ammeters, voltmeters, oscillographs, etc. a simple example being shown in Figure 3, in which the constant voltage is indicated by a voltmeter 17, the change of current in the circuit indicated by an ammeter 18 being a direct measure of the change in resistance of the resistance elements 8, which if properly calibrated indicates the force acting on the resistance elements 8.

In order to provide said resistance elements 8 of such nature that the electrical resistance thereof is a function of the pressure applied to them, said elements may, for instance, be made to consist of a stack or stacks of carbon discs or annular rings 19.

Having thus described the invention, its operation is as follows:

The parts being assembled as in the example shown in the drawing, the pressure from the driving member 1 is communicated to the driven member 3 through the intermediately disposed resistance elements 8, so that their resistance is increased or diminished according to the pressure applied thereto. As the voltmeter 17 indicates the constant voltage of the battery 16, the ammeter 18 will indicate the change in current in the circuit, which is a direct measure of the change in the resistance of the resistance elements 8, and by calibration indicates the force or pressure acting on said elements.

Having thus fully described the invention, I do not wish to be understood as limiting myself to the exact construction herein set forth, but I consider myself clearly entitled to all such changes and modifications as fall within the limit and scope of the appended claims.

What I claim as new and desire to secure by Letters Patent of the United States, is:

1. A device of the character described including a driving member, a driven member, an electrical circuit, the driving member having a plurality of radial spokes, the driven member having a plurality of lugs extending within the spaces between the spokes, a plurality of electrical resistance elements in said circuit and interposed between the said spokes of the driving member and the said lugs of the driven member, said resistance elements including a plurality of carbon members, a buffer spring on each side of each of the resistance elements, means for electrically insulating the resistance elements from said buffer springs, a source of current and means for measuring the electrical resistance of said elements.

2. A dynamometer including a driving member having a plurality of spokes, a driven member having a plurality of lugs extending within the spaces between the spokes, a pair of electrical resistors in each of the said spaces and arranged one on each side of the lug, one end of each resistor being mechanically connected to the lug and the other end being mechanically connected to an adjacent spoke, each of said resistors being of a nature such that the electrical resistance thereof is a function of the pressure applied thereto, means electrically insulating the resistors from the said spokes and lugs, and electrical resistance measuring means connected in electrical circuit with the said resistors.

3. A transmission dynamometer comprising a driving member, a driven member, elastic means coupling the said members for transmitting the torque of the driving member to the driven member, said elastic coupling means including an electrical resistance unit of which the electrical resistance is a function of the pressure applied thereto, and tension springs forwardly and rearwardly of the resistance unit to yieldably support the latter between the members and to dampen out variations in resistance due to variations in torque transmitted, and resistance measuring means connected in electrical circuit with said resistance unit.

MARSHALL A. SMITH, Jr.